(12) United States Patent
Tarahomi

(10) Patent No.: US 6,287,442 B1
(45) Date of Patent: Sep. 11, 2001

(54) INJECTION MOLDED THERMOPLASTIC INTEGRATED FRONT END REINFORCEMENT AND METHOD OF MAKING SAME

(75) Inventor: Sassan Tarahomi, Brighton, MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 09/578,024

(22) Filed: May 24, 2000

(51) Int. Cl.⁷ .................................................. C25D 13/00
(52) U.S. Cl. ............................................................ 204/479
(58) Field of Search ............................................... 204/479

(56) References Cited

U.S. PATENT DOCUMENTS 6,086,958 * 7/2000 Russel et al. ........................ 427/421

OTHER PUBLICATIONS

Test Data and Project Reports from May 1998 and Sep. 1998 Test at Ford Motor Company (1988).
SMC GOR Process Flowchart, pp. 1–3 (No Date Available).

* cited by examiner

Primary Examiner—Kishor Mayekar
(74) Attorney, Agent, or Firm—Brooks & Kushman P.C.

(57) ABSTRACT

A vehicle body front end preassembly and method of making a vehicle front end assembly is disclosed. The vehicle body front end preassembly includes a frame to which an integrated front end module formed by an injection molding process is secured. The integrated front end module extends transversely across the vehicle and is provided with a plurality of fastener receptacles that are integrally molded as part of the integrated front end module. A plurality of reinforcement ribs are integrally molded as part of the integrated front end module. Unpainted body panels are secured to some of the fastener receptacles. The frame, injection molded integrated front end module, and body panels are then hot dipped in an electro-coating bath. According to the method of the present invention, the integrated front end module is injection molded to include integrally molded fastener receptacle and integrally molded reinforcement ribs that are injection molded from a fiber reinforced thermoplastic polymer. A partially assembled vehicle body is provided that has partially unattached body panels that are secured to the frame. Unattached body panels are secured to the integrated front end module. The preassembly is then immersed in an electro-coat bath, painted and then baked in a paint oven.

8 Claims, 3 Drawing Sheets

INJECTION MOLDED THERMOPLASTIC INTEGRATED FRONT END REINFORCEMENT AND METHOD OF MAKING SAME

TECHNICAL FIELD

The present invention relates to injection molding an integrated front end reinforcement for a vehicle.

BACKGROUND ART

Many components are assembled to the front end of a vehicle that require precise alignment and durable mounting mechanisms. Headlights, parking lights, a decorative grill and a radiator are parts that may be attached directly or indirectly to a grill opening reinforcement. Grill opening reinforcements have been found to be helpful in tying together such components with the forward section of front fenders and the frame of a vehicle as it is being assembled.

Other integrated front end modules that support other parts include bumper reinforcements, radiator supports, and inner fender reinforcements. These parts are relatively large and must maintain close tolerances for critical dimensions to meet strict fit and finish standards.

Grill opening reinforcements and other integrated front end modules have traditionally been manufactured from a plurality of sheet metal stampings that are either welded or fastened together. Metal integrated front end modules are heavy and add to the overall vehicle weight. Being formed in multiple pieces, metal integrated front end modules require labor intensive assembly operations. Quality control is required to assure proper location of the mounting mechanisms for multiple parts assembled to the integrated front end module.

Recently, sheet molding compound (SMC) has been used to manufacture grill opening reinforcements. SMC grill opening reinforcements are generally slightly less weight than metal grill opening reinforcements. SMC grill opening reinforcements require a substantial investment in tooling for both molding the SMC and finishing the SMC parts after molding. It is generally necessary to machine a SMC grill opening reinforcement by drilling, punching or shaping with a router fastener holes and locating surfaces. Also, the SMC process is relatively slow requiring a large number of mold cavities to manufacture parts on a production basis. SMC is also not a recyclable material which means that at the end of the car's life cycle or if there is any scrap in manufacturing process, it is necessary to dispose of the SMC grill opening reinforcement in landfill instead of recycling.

It is believed that prior art attempts have been made to injection mold structural parts for vehicles. In normal vehicle assembly operations, vehicle subassemblies are subject to electro-coating at temperatures in excess of 450° F. and after painting vehicle subassemblies are cycled through paint drying ovens where they are exposed to temperatures in excess of 200° F. Prior attempts to utilize injection molded thermoplastic parts that are attached to automobile vehicle bodies prior to electro-coating and paint drying oven exposure have been unsuccessful when attempted with large parts such as grill opening reinforcements and other large integrated modules. Exposure of large weight bearing parts to high temperatures results in a loss of dimensional stability since the weight of parts attached to injection molded parts causes the injection molded parts to sag. This results in poor fit and finish and difficulties in assembling components after being exposed to high temperatures.

These and other disadvantages and problems encountered by the prior art are addressed by the present invention as summarized below.

DISCLOSURE OF INVENTION

According to the present invention, a method of making an integrated front end reinforcement module is disclosed. The injection molded front end reinforcement panel includes integrally molded fastener bosses, fastener receptacles and integrally molded reinforcement ribs that are formed of a fiber reinforced thermoplastic polymer. A partially assembled vehicle body is provided that has partially unattached body panels secured to a frame. The integrated front end module is secured to the frame. Unattached body panels are attached to the integrated front end module. Brackets are secured to the integrated front end module. The above assembly is referred to as a basic vehicle front end assembly and does not include subsequently assembled of light receptacles, bumper trim, and the decorative grill. The basic vehicle front end assembly is then immersed in an electrcocoat bath that is heated to more than 450° F. The basic vehicle front end assembly is then painted and baked in paint ovens at a temperature of more than 200° F. Subsequently, the light receptacles, lights, bumper trim, and grill are secured to the respective brackets and mounting surfaces.

According to another aspect of the present invention, a grill opening reinforcement is molded in one piece and extends transversely across the entire width of the front end assembly from a right front fender to a left front fender. During the molding step, the fastener bosses are formed with core cylinders provided in an injected molded die that eliminates post-forming machining operations such as drilling, punching and shaping with a router.

According to another aspect of the present invention, the fiber reinforced thermoplastic polymer used includes at least 65% post-consumer recycled polyethylene terephthalate. The polyethylene terephthalate is reinforced with at least 45% glass fibers and mineral filled.

According to another aspect of the invention, a vehicle front end assembly is provided. The vehicle front end assembly includes a frame and an injection molded front end module is secured to the frame to extend transversely across the vehicle at the front end thereof. The integrated front end module has a plurality of fastener bosses integrally molded as a part of the front end module and a plurality of reinforcement ribs integrally molded as part of the front end module. A plurality of unpainted body panels are secured to the fastener bosses of the front end module. A plurality of brackets could be secured to the fastener bosses of the front end module. Alternatively, ribs or flanges provided on the reinforcement can be directly secured to the body. The frame, injection molded front end module, body panels and brackets are assembled together to form a vehicle body/frame pre-assembly and are subsequently immersed in a hot dipped electro-coating bath.

According to another aspect of the invention, the vehicle body/frame pre-assembly further comprises a paint coating applied thereto that is baked in an oven.

The front end modular reinforcement panel is formed from a glass fiber/mineral filled thermoplastic polymer. The thermoplastic polymer is preferably polyethylene terephthalate.

The method of making a vehicle front end assembly and front end pre-assembly offers advantages in that cost savings may be achieved through labor and tooling cost reduction that more than offset the increased cost of the fiber filled thermoplastic polymer compound. Improved fit and finish possible with the method can enhance overall product quality.

Another advantage of the invention is that a grill opening reinforcement has dimensional stability even after heating in the electro-coat immersion bath and paint ovens.

Substantial weight savings are possible depending in part on the design of the one piece grill opening reinforcement.

The use of thermoplastic polymer formed by injection molding reduces or eliminates machining that was formerly required of SMC grill opening reinforcement panels that required drilling, punching and shaping with router tools. According to the present invention, the injection molded thermoplastic material may be made to net size and shape with fastener bosses being integrally molded.

The thermoplastic polymer is easily recyclable. Further, parts such as grill opening reinforcements that are injection molded from a thermoplastic polymer are easier to manufacture and have less scrap when compared to SMC front end modules that may crack, resulting in the creation of scrap.

These and other objects and advantages of the present invention are better understood in view of the attached drawings and in light of the following detailed description of the invention.

BEST MODE FOR CARRYING OUT THE INVENTION

Figure 1:
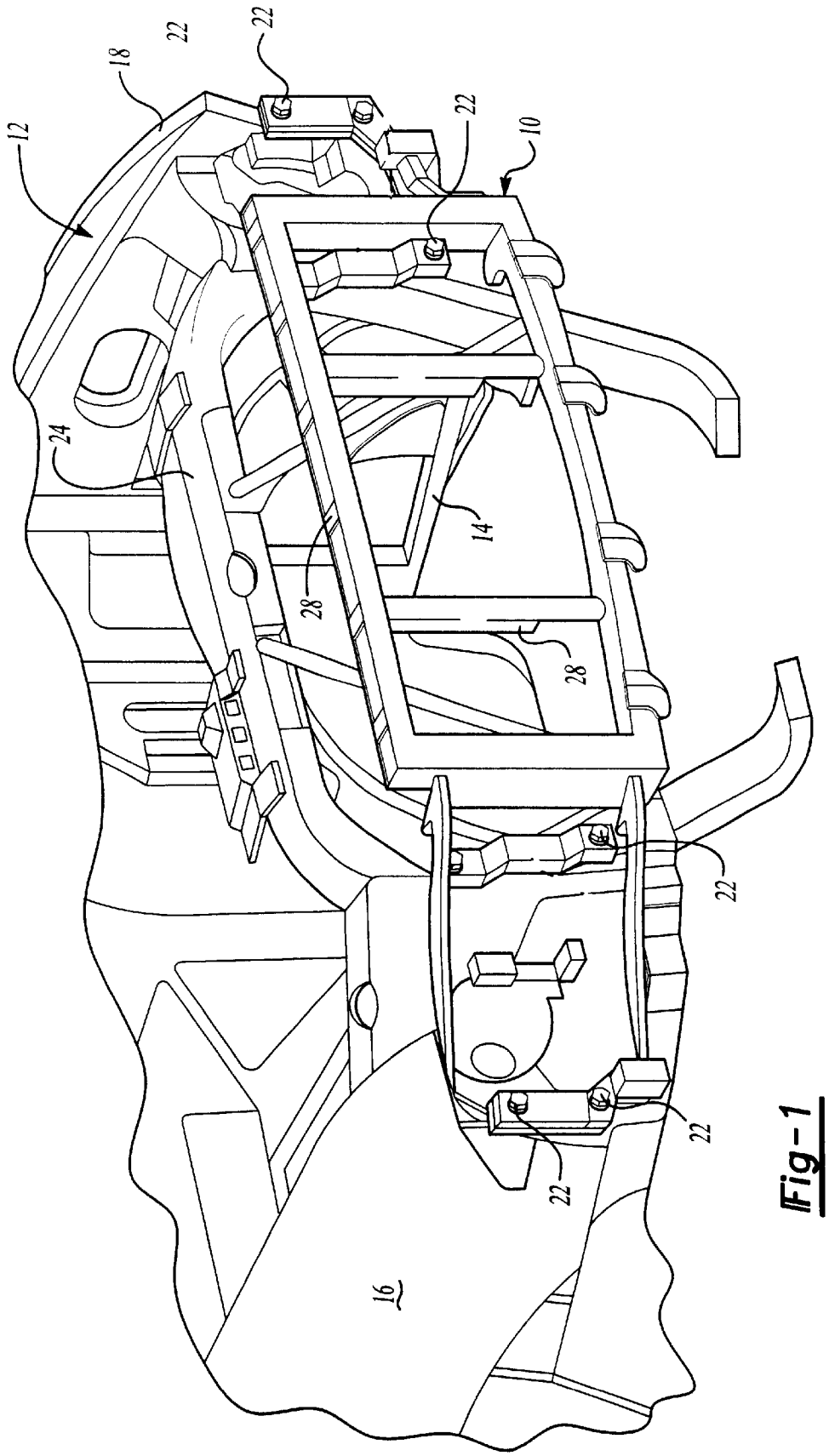
FIG. 1 is a fragmentary perspective view of an integrated front end reinforcement secured to a partially assembled vehicle.
Figure 2:
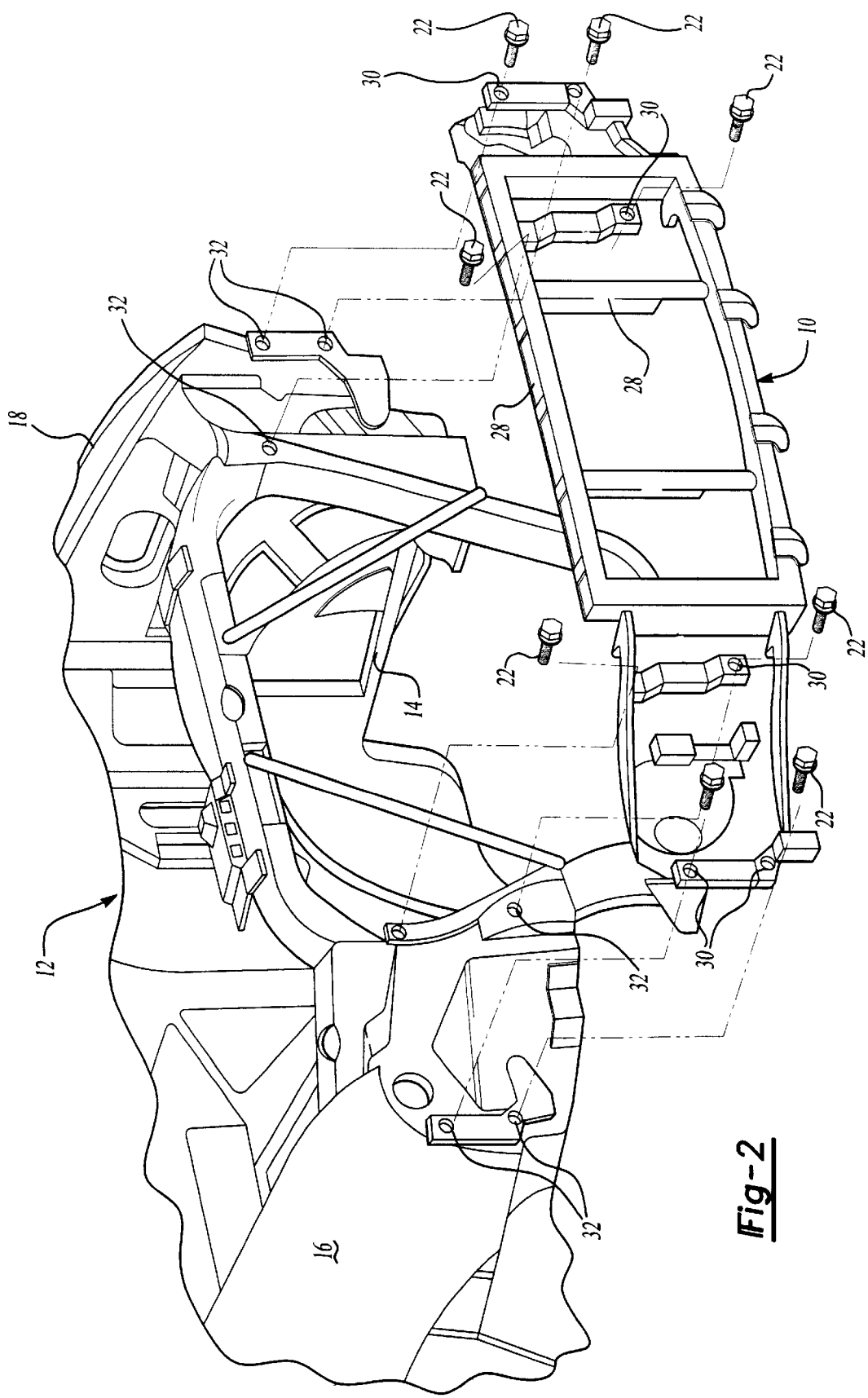
FIG. 2 is a fragmentary exploded perceptive view of an integrated front end reinforcement and a partially assembled vehicle body.

Referring now to FIGS. 1 and 2, an integrated front end module 10 and a vehicle subassembly 12 to which the front end module 10 is secured is shown. The front end module 10 is secured to the vehicle subassembly 12 and the frame 14 of the vehicle in the automobile assembly process. Right and left front quarter panel 16 and 18 are secured to the front end module 10. The front quarter panels 16, 18 are also referred to as fenders. Fasteners 22 are used to secure the front end module 10 to the vehicle subassembly 12, frame 14 and right and left front quarter panel 16 and 18. A radiator support frame 24 forms part of the vehicle subassembly 12.

Reinforcement ribs 28 are provided on the front end module 10 to reinforce the front end module 10 in locations according to the requirements of a particular part as indicated by engineering computer aided design models. Holes 30 are provided in the front end module 10 and corresponding fastener receptacles 32 are provided on the vehicle subassembly 12 so that fasteners 22 may be inserted through the holes 30 and into the fastener receptacles 32. The fastener receptacles 32 may include clinch nuts or weld nuts, not shown, in which the fasteners 22 are tightened to assemble the front end module 10 to the vehicle subassembly 12.

Light receptacle brackets 34 are provided for assembly to the front end module 10 or the vehicle subassembly 12. Headlights or parking lights, not shown, are later assembled to the light receptacle brackets 34 after painting operations have been completed.

Figure 3:
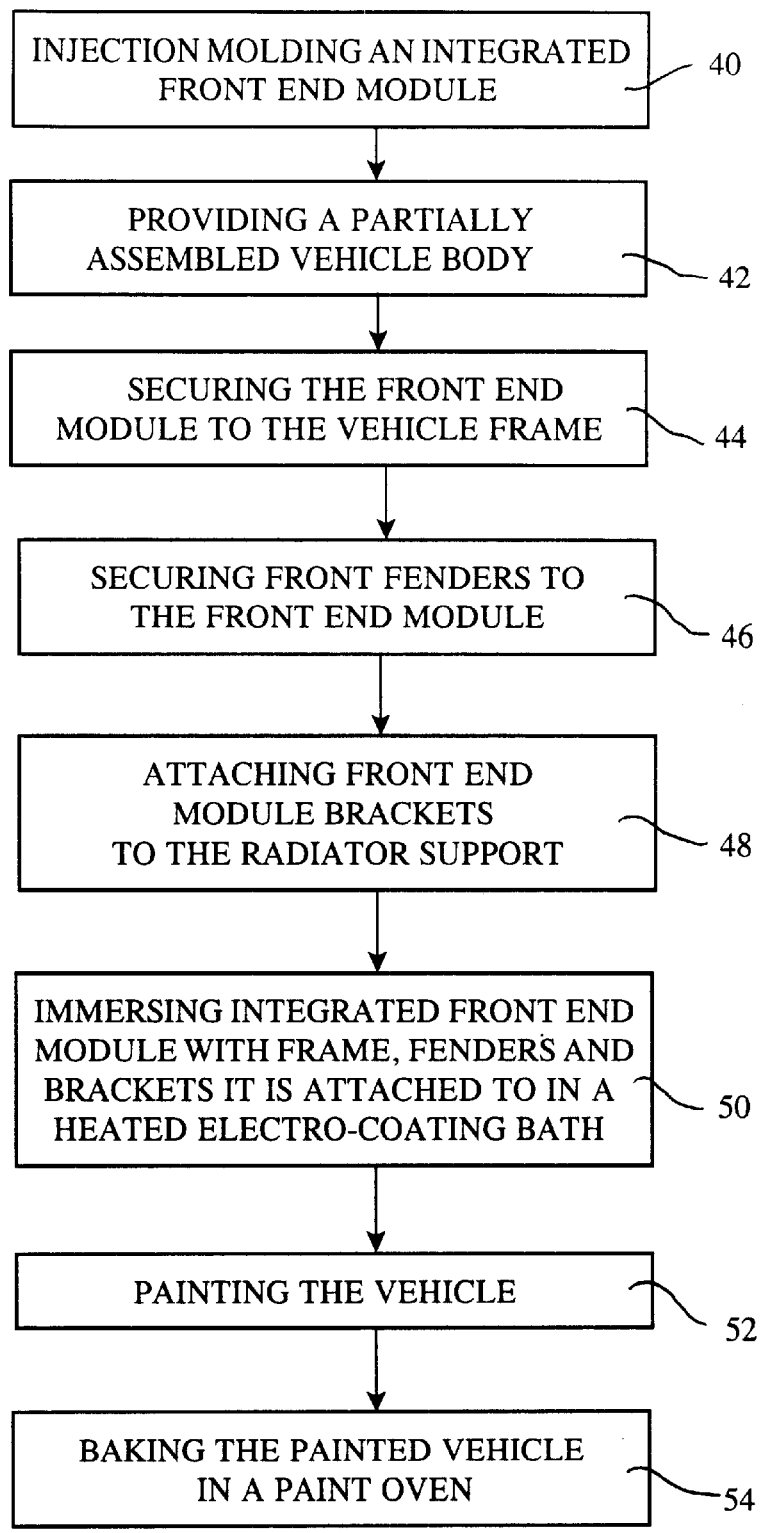
FIG. 3 is a flowchart illustrating the steps of the method of the present invention.

Referring now to FIG. 3, the process of the present invention is described with reference to a flowchart. The integrated front end module is injection molded at 40. A partially assembled vehicle body is provided at 42. The front end module is secured to the vehicle frame at 44 and the front fenders or quarter panels are secured to the front end module at 46. Front end module brackets are then attached to the radiator support at 48. The integrated front end module with a frame, fenders and brackets attached to it are then submerged in a heated electro-coating bath at 50. The vehicle is then painted at 52 and the painted vehicle is then baked in a paint oven at 54.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making a vehicle front end assembly comprising:

injection molding an integrated front end reinforcement module including integrally molded fastener receptacles and integrally molded reinforcement ribs from a fiber reinforced thermoplastic polymer;

providing a partially assembled vehicle body having partially unattached body panels that are secured to the frame;

securing a first set of fastener receptacles formed on the integrated front end reinforcement module to a frame;

attaching the unattached body panels to a second set of fastener receptacles formed on the integrated front end reinforcement module to form a basic vehicle front end assembly;

immersing the basic vehicle front end assembly in an electro-coat bath that is heated to more than 450 degrees Fahrenheit;

painting the basic vehicle front end assembly; and baking the basic vehicle front end assembly in a paint oven.

2. The method of making a vehicle front end assembly of claim 1 further comprising assembling a plurality of light receptacles and a grill to the basic front end assembly after the baking step.

3. The method of making a vehicle front end assembly of claim 1 wherein the integrated front end reinforcement module is a grill opening reinforcement that is molded in one piece and extends transversely across the entire width of the front end assembly from a right front fender to a left front fender.

4. The method of making a vehicle front end assembly of claim 1 wherein the molding step includes forming the sets of fastener receptacles provided in an injection molding die that eliminates post forming machining operations.

5. The method of making a vehicle front end assembly of claim 1 wherein the fiber reinforced thermoplastic polymer includes at least 65% post consumer recycled polyethylene terephthalate.

6. The method of making a vehicle front end assembly of claim 5 wherein the fiber reinforced thermoplastic polymer includes at least 45% glass fibers and mineral.

7. The method of making a vehicle front end assembly of claim 1 wherein the step of baking is performed for at least one hour.

8. The method of making a vehicle front end assembly of claim 1 further including the step of attaching brackets for a plurality of light receptacles and a grill to a third set of fastener receptacles formed on the integrated front end reinforcement module.

* * * * *

UNITED STATES PATENT AND TRADEMARK OFFICE
CERTIFICATE OF CORRECTION

PATENT NO. : 6,287,442 B1
DATED : September 11, 2001
INVENTOR(S) : Sassan Tarahomi It is certified that error appears in the above-identified patent and that said Letters Patent is hereby corrected as shown below:

Column 4,
Line 22, delete "the frame" and insert -- a frame --.
Line 26, delete "a frame" and insert -- the frame --.

Signed and Sealed this

Twenty-third Day of July, 2002

Attest:

JAMES E. ROGAN
Attesting Officer
Director of the United States Patent and Trademark Office